US012783938B2

(12) United States Patent
Meng et al.

(10) Patent No.: US 12,783,938 B2
(45) Date of Patent: Nov. 3, 2026

(54) MODEL TRAINING DEVICE AND MODEL TRAINING METHOD

(71) Applicant: Canon Kabushiki Kaisha, Tokyo (JP)

(72) Inventors: Fanjie Meng, Beijing (CN); Bing Han, Beijing (CN); Sha Wang, Beijing (CN); Ye Yue, Beijing (CN); Xu Yang, Beijing (CN); Tianhong Li, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 1064 days.

(21) Appl. No.: 17/811,607

(22) Filed: Jul. 11, 2022

(65) Prior Publication Data

US 2023/0019622 A1 Jan. 19, 2023

(30) Foreign Application Priority Data

Jul. 14, 2021 (CN) ......................... 202110793550.3
May 10, 2022 (JP) ................................ 2022-077578

(51) Int. Cl.
*G06N 20/00* (2019.01)

(52) U.S. Cl.
CPC .................................... *G06N 20/00* (2019.01)

(58) Field of Classification Search
CPC .......... G06N 20/00; G06T 2207/10081; G06T 2207/10116; G06T 2207/20081;
(Continued)

(56) References Cited

U.S. PATENT DOCUMENTS 10,872,599 B1 * 12/2020 Wu ......................... G10L 15/08
10,949,951 B2 3/2021 Tang et al.
(Continued)

FOREIGN PATENT DOCUMENTS

CN 108852268 11/2018
CN 109840913 6/2019
(Continued)

OTHER PUBLICATIONS

Taha et al., "Metrics for evaluating 3D medical image segmentation: analysis, selection, and tool", Taha and Hanbury BMC Medical Imaging (2015) 15:29, 28 pages, DOI 10.1186/s12880-015-0068-x.
(Continued)

*Primary Examiner* — Iriana Cruz
(74) *Attorney, Agent, or Firm* — Oblon, McClelland, Maier & Neustadt, L.L.P.

(57) ABSTRACT

A model training device according to an embodiment of the present disclosure includes processing circuitry. The processing circuitry is configured to obtain an initial learning model by learning a data set including medical images as learning data. The processing circuitry is configured to evaluate the initial learning model by using a global metric, so as to obtain error data sets each having an outlier from among a plurality of data sets used in the evaluation. The processing circuitry is configured to obtain a plurality of error data set groups by grouping the plurality of error data sets while using a local metric. The processing circuitry is configured to specify model training information with respect to each of the error data set groups.

10 Claims, 11 Drawing Sheets

(58) Field of Classification Search
CPC . G06T 2207/20084; G06T 2207/30048; G06T 2207/30056; G06T 2207/30092; G06T 7/11
See application file for complete search history.

(56) References Cited

U.S. PATENT DOCUMENTS

| | | | | |
|---|---|---|---|---|
| 11,112,478 | B2 | 9/2021 | Boernert et al. | |
| 2020/0013158 | A1 | 1/2020 | Asai et al. | |
| 2020/0065940 | A1 | 2/2020 | Tang et al. | |
| 2020/0126207 | A1* | 4/2020 | Saltz | G06T 7/11 |
| 2020/0250814 | A1* | 8/2020 | Stoval, III | G06N 3/04 |
| 2020/0286614 | A1* | 9/2020 | Do | G06N 7/01 |
| 2021/0109180 | A1 | 4/2021 | Boernert et al. | |
| 2022/0051114 | A1* | 2/2022 | Lyman | G16H 50/20 |
| 2022/0284643 | A1* | 9/2022 | Jha | G06T 11/005 |
| 2022/0292738 | A1* | 9/2022 | Shi | G06T 7/13 |
| 2022/0301156 | A1* | 9/2022 | Fang | G16H 50/70 |
| 2023/0177681 | A1* | 6/2023 | Oubel | G06T 7/0012 382/128 |
| 2023/0377149 | A1* | 11/2023 | Hiasa | A61B 6/5217 |
| 2024/0203566 | A1* | 6/2024 | Kim | A61B 5/00 |

FOREIGN PATENT DOCUMENTS

| | | |
|---|---|---|
| CN | 111985536 | 11/2020 |
| CN | 113052203 | 6/2021 |
| JP | 2020-008607 A | 1/2020 |
| JP | 2020-064609 A | 4/2020 |
| JP | 2020-512143 A | 4/2020 |

OTHER PUBLICATIONS

Office Action issued on Dec. 17, 2025 in corresponding Chinese Patent Application No. 202110793550.3. (10 Pages).

Office Action issued Apr. 29, 2026, in corresponding Chinese Patent Application No. 202110793550.3, 8 pages.

* cited by examiner

FIG.6

| | OVERSEGMENTATION (D > 0 AND | D | > T1) | UNDERSEGMENTATION (D < 0 AND | D | > T2) |
|---|---|---|
| SUBREGION R1 | GROUP 1 (O7, O9, O11, O16) | GROUP 2 (O6, O12, O13) |
| SUBREGION R2 | GROUP 3 (O1, O3, O5) | GROUP 4 (O17, O14) |
| SUBREGION R3 | GROUP 5 (O2, O4) | GROUP 6 (O8, O18) |
| SUBREGION R4 | GROUP 7 (O15, O10) | GROUP 8 (O19, O20) |

FIG.7

| | IMAGE-RELATED CHARACTERISTICS | PATHOLOGICAL CHARACTERISTICS |
|---|---|---|
| GROUP 1 | I1: ABDOMEN CE +<br>I2: DYNAMIC ARTIFACTS<br>I3: SLICE THICKNESS 1 mm | P1: HEPATOCELLULAR CARCINOMA (HCC)<br>P2: HEPATIC FIBROSIS |
| GROUP 2 | I4: LUNGS + ABDOMEN CE +<br>I5: DYNAMIC ARTIFACTS<br>I6: SLICE THICKNESS 5 mm | P3: METASTATIC LIVER TUMOR |
| GROUP 3 | ······ | ······ |
| GROUP 4 | ······ | ······ |
| GROUP 5 | ······ | ······ |
| GROUP 6 | ······ | ······ |
| GROUP 7 | ······ | ······ |
| GROUP 8 | ······ | ······ |

FIG.12

| | OVERSEGMENTATION (D > 0 AND \| D \| > T3) | UNDERSEGMENTATION (D < 0 AND \| D \| > T4) |
|---|---|---|
| LESION SITE P1 | GROUP 1 (O5, O10, O14, O17, O20) | GROUP 2 (O1, O6, O9) |
| LESION SITE P2 | GROUP 3 (O7, O11, O13) | GROUP 4 (O16, O18) |
| LESION SITE P3 | GROUP 5 (O2, O3, O4, O8) | GROUP 6 (O12, O15, O19) |

FIG.13

| | IMAGE-RELATED CHARACTERISTICS | ANATOMICAL CHARACTERISTICS | PATHOLOGICAL CHARACTERISTICS |
|---|---|---|---|
| GROUP 1 | I1: ABDOMEN CE + I2: DYNAMIC ARTIFACTS I3: SLICE THICKNESS 1 mm | A1: GROW IN BLOOD VESSEL A2: SIZE 10 TO 25 mm | P1: HEPATOCELLULAR CARCINOMA (LI-RADS 4) P2: HEPATIC FIBROSIS |
| GROUP 2 | I4: LUNGS + ABDOMEN CE + I5: DYNAMIC ARTIFACTS I6: SLICE THICKNESS 5 mm | A3: LIVER SEGMENT VIII A4: SIZE 10 TO 50 mm | P3: LIVER TUMOR |
| GROUP 3 | ······ | | ······ |
| GROUP 4 | ······ | | ······ |
| GROUP 5 | ······ | | ······ |
| GROUP 6 | ······ | | ······ |

MODEL TRAINING DEVICE AND MODEL TRAINING METHOD

CROSS-REFERENCE TO RELATED APPLICATIONS

This application is based upon and claims the benefit of priority from Chinese Patent Application No. 202110793550.3, filed on Jul. 14, 2021; and Japanese Patent Application No. 2022-077578, filed on May 10, 2022, the entire contents of all of which are incorporated herein by reference.

FIELD

Embodiments described herein relate generally to a model training device and a model training method.

BACKGROUND

Along with development of medical image processing apparatuses such as X-ray imaging apparatuses, Computed Tomography (CT) apparatuses, and ultrasound diagnosis apparatuses, automatic segmentation techniques and automatic image interpretation techniques to be applied to medical images have also been developed. In particular, in combination with the Deep Learning (DL) technology, it became possible in recent years to automatically perform image processing such as segmentation of medical images with application of a trained model, as a result of training the model for image segmentation or the like with the use of clinical data sets. For instance, a medical image from each actual example is used as one data set.

When deep learning is implemented, a model framework is investigated, sufficient learning data sets are established, and a large-scale calculation is performed. It is generally considered that the more learning data is available, the better capability will be achieved, which will then make it possible to train a model with different types of input data.

However, in the field of medical image segmentation, for example, training a model requires using medical image examples on which labeling of segmentation or the like has clinically been completed. Because it is not easy to obtain clinical data sets having high quality labeling, it is extremely important to accurately estimate the quantity of pieces of learning data required to achieve a goal precision level of the learning.

At present, examples of methods for estimating the quantity of pieces of learning data include: a method by which the quantity is humanly determined by an expert in a relevant field empirically; a method by which an overall sample quantity is estimated on the basis of a statistical method; and a method by which a required data amount is predicted on the basis of a learning curve of the model.

Among these methods, the method by which the quantity is humanly determined by an expert may bring out a subjective result in many situations. Further, the method based on statistics and the prediction method based on the learning curve of the model require a large number of actual examples of clinical medical images for the statistics or tests. As for these actual examples, mutually-different actual examples may have large differences in medical images depending on clinical conditions. For example, with medical images from a group of healthy people, results of segmenting an organ are relatively ideal in many situations; however, with medical images from a group of diseased patients, results of segmenting an organ are not very ideal in many situations.

For these reasons, according to the abovementioned methods, it is difficult to obtain a high-precision model, even when the data amount of the learning data is estimated. Further, it is necessary to solve the problem of determining what type of learning data is to be acquired.

To improve capabilities of models, all of the following elements need to be further studied: what type of data sets need to be increased, how many data sets need to be additionally acquired, and how much progress will be achieved.

BRIEF DESCRIPTION OF THE DRAWINGS

FIG. 6 is a table illustrating an example of an error data set grouping process according to the first embodiment;

FIG. 7 is a table illustrating examples of characteristics of error data set groups according to the first embodiment;

FIG. 12 is a table illustrating an example of an error data set grouping process according to the second embodiment;

FIG. 13 is a table illustrating examples of characteristics of error data set groups according to the second embodiment.

DETAILED DESCRIPTION

Figure 1A:
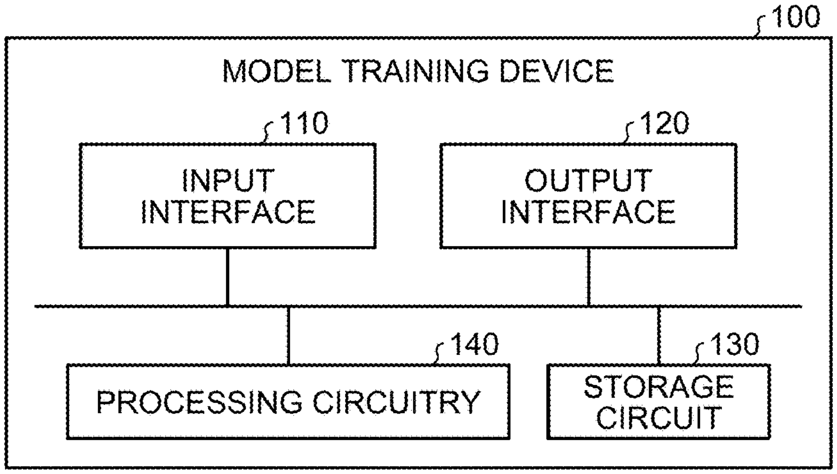
FIG. 1A is a block diagram illustrating an exemplary configuration of a model training device according to a first embodiment.

A model training device according to an embodiment of the present disclosure includes processing circuitry. The processing circuitry is configured to obtain an initial learning model by learning a data set including medical images as learning data. The processing circuitry is configured to evaluate the initial learning model by using a global metric, so as to obtain, as error data sets, data sets each having an outlier from among a plurality of data sets used in the evaluation. The processing circuitry is configured to obtain a plurality of error data set groups by grouping the plurality of error data sets while using a local metric. The processing circuitry is configured to specify model training information with respect to each of the error data set groups.

In the following sections, exemplary embodiments of a model training device and a model training method of the present disclosure will be explained, with reference to the accompanying drawings.

A model training device according to an embodiment of the present disclosure may be installed as software in a device including a Central Processing Unit (CPU) and a memory such as an independent computer structured with a plurality of functional modules or may be installed in a plurality of devices in a distributed manner, so as to be realized as a result of a processor executing the functional modules of the model training device stored in the memory. Alternatively, the model training device may be realized in the form of hardware as circuitry capable of implementing functions of the model training device. The circuitry that realizes the model training device is capable of transmitting and receiving data and acquiring data via a network such as the Internet. Further, the model training device according to an embodiment of the present disclosure may directly be attached to a medical image processing apparatus (e.g., a CT apparatus, a magnetic resonance imaging apparatus, etc.) as a part of the medical image processing apparatus.

In the following sections, a set of medical image data having a plurality of pixels is used as a data set. The data set is a unit of samples used in learning data and may be referred to as samples. The format and the structure of the data set may vary among different types of medical image processing apparatuses to be used and different imaged sites; however, for the sake of convenience in the explanations, an example will be explained in which three-dimensional images of the abdomen (3D abdomen images) are acquired by an apparatus (e.g., a CT apparatus, a magnetic resonance imaging apparatus, etc.) capable of three-dimensionally performing a 3D scan. One data set is structured for each of the three-dimensional abdomen images, while the liver is used as a site of interest in a medical examination. However, the site of interest may be other sites. Also, depending on the site of interest and the device in use, other types of images such as two-dimensional images or ultrasound scan images, for example, may be used.

First Embodiment

To begin with, a first embodiment will be explained, with reference to FIGS. 1 to 9.

FIG. 1A is a block diagram illustrating an exemplary configuration of a model training device 100 according to the first embodiment. For example, as illustrated in FIG. 1A, the model training device 100 includes an input interface 110, an output interface 120, a storage circuit 130, and processing circuitry 140.

Figure 1B:
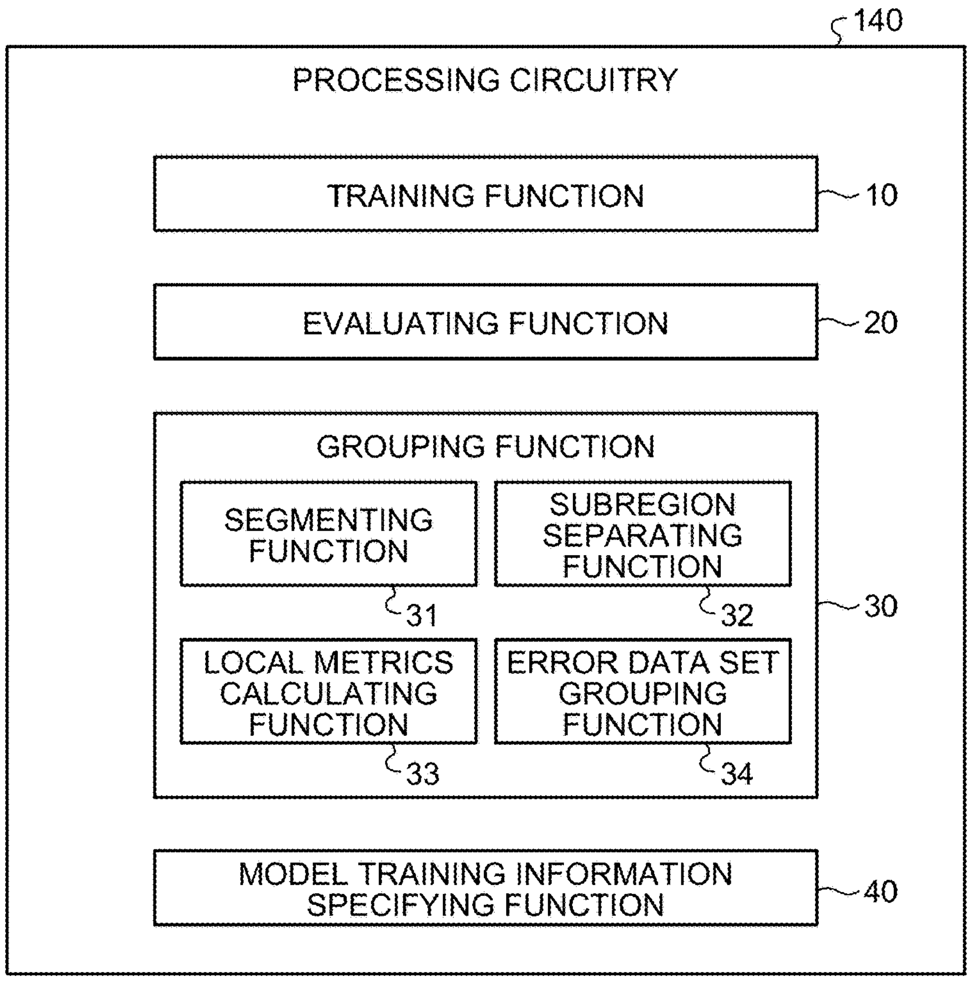
FIG. 1B is a block diagram illustrating an exemplary functional configuration of processing circuitry of the model training device according to the first embodiment.

FIG. 1B is a block diagram illustrating an exemplary functional configuration of the processing circuitry 140 of the model training device 100 according to the first embodiment. As illustrated in FIG. 1B, the processing circuitry 140 is configured to implement a training function 10, an evaluating function 20, a grouping function 30, and a model training information specifying function 40. In this situation, the training function 10, the evaluating function 20, the grouping function 30, and the model training information specifying function 40 are examples of a training unit, an evaluating unit, a grouping unit, and a model training information specifying unit, respectively. In the present example, processing functions executed by the constituent elements of the processing circuitry 140, namely, the training function 10, the evaluating function 20, the grouping function 30, and the model training information specifying function 40, are recorded in the storage circuit 130 in the form of computer-executable programs, for example. The processing circuitry 140 is a processor configured to realize the functions corresponding to the programs, by reading and executing the programs from the storage circuit 130. Further, the storage circuit 130 is configured to store therein a learning-purpose program (explained later).

The term "processor" used in the above explanations denotes, for example, a Central Processing Unit (CPU), a Graphics Processing Unit (GPU), or circuitry such as an Application Specific Integrated Circuit (ASIC) or a programmable logic device (e.g., a Simple Programmable Logic Device [SPLD], a Complex Programmable Logic Device [CPLD], or a Field Programmable Gate Array [FPGA]). When the processor is a CPU, for example, the processor realizes the functions by reading and executing the programs saved in the storage circuit 130. Alternatively, when the processor is an ASIC, for example, instead of the programs being saved in the storage circuit 130, the programs are directly incorporated in the circuitry of the processor. Further, the processors according to the present embodiment do not each necessarily have to be structured as a single circuit. It is also acceptable to structure one processor by combining together a plurality of independent circuits, so as to realize the functions thereof. Further, two or more of the constituent elements illustrated in FIG. 1B may be integrated in a single processor so as to realize the functions thereof.

To begin with, a process performed by the training function 10 of the model training device 100 according to the first embodiment will be explained.

For example, the training function 10 is configured to train a model to perform a segmentation of the liver on an abdomen image (a medical image taken of the abdomen), by learning a plurality of existing data sets as learning data. To perform the segmentation of the liver, for example, at the time of a medical image segmentation on the abdomen image to distinguish positions of organs, an image region representing the liver serving as a site to be detected (hereinafter, "detection target") is specified as a result of an organ segmentation. Further, for the obtained model, as a result of processes performed by the evaluating function 20, the grouping function 30, and the model training information specifying function 40 (described later), model training information for training the model is specified. The training function 10 is configured to train the model by learning the learning data on the basis of the model training information.

In this situation, the "learning data" is used in a broad sense and includes a training set for training/generating a model and a test set for testing (evaluating) the generated model. Further, the training set and the test set each include a plurality of data sets. For example, to train the model, a publicly-known deep learning method may be used, such as implementing supervised learning by establishing a Ground Truth (GT) from the plurality of data sets in the training set. In other words, the training function 10 is configured to train the model, by acquiring the training set and the test set each including a plurality of data sets of medical images taken of the abdomen and further establishing the Ground Truth (GT) on the basis of a plurality of pieces of data sets in the training set. Among the plurality of data sets in the training set, data sets with which the ground truth has been established represent data sets on which image labeling has correctly been performed (which means, in the first embodiment, that the liver was correctly segmented). When the generated model is put to use, an unlabeled medical image is input to the model, so that the model outputs a medical image labeled with a result of the organ segmentation.

In this situation, the existing data sets used by the training function 10 are not particularly limited and may be a plurality of data sets from actual examples stored in the model training device 100 in advance. The quantity and the nature of the data sets are arbitrary as long as a training set and a test set are formed to train the model. Further, the existing data set used by the training function 10 may be a single data set. In other words, the training set includes at least one data set.

Next, a process performed by the evaluating function 20 of the model training device 100 according to the first embodiment will be explained.

The evaluating function 20 is configured to evaluate the model generated by the training function 10 by using global metrics, so as to obtain, as error data sets, data sets each having an outlier, from among the plurality of data sets in the test set used in the evaluation. More specifically, while the training function 10 is generating the model by gradually inputting the plurality of data sets from the training set, the evaluating function 20 is configured to generate a learning curve of the model by testing the generated model at mutually-different stages while using the plurality of data sets in the test set. After that, the evaluating function 20 is configured to obtain the plurality of error data sets from the test set, by calculating a global metric with respect to each of the plurality of data sets in the test set.

The global metrics are metrics that comprehensively evaluate an output result (e.g., the labeling of the medical images) of the model and may be referred to as global evaluation metrics. Commonly used in the field of medical image segmentation are metrics that measure similarity between two sets, i.e., metrics that measure, with a global angle, similarity between an output result of the model (a segmentation result) and a correct answer segmentation result from the test set. For example, in the field of segmenting three-dimensional medical images, examples of commonly-used global metrics include a dice coefficient (a dice similarity coefficient) and a detection evaluation function called an Intersection Over Union (IOU). Other examples of global metrics include overlap-based metrics and volume-based metrics. The following document may be referenced for the calculation of global metrics: Metrics for evaluating 3D medical image segmentation: analysis, selection, and tool (Taha and Hanbury BMC Medical Imaging (2015) 15:29. DOI 10.1186/s12880-015-0068-x). In the present example, for the sake of convenience in the explanation, it is assumed that the evaluating function 20 is configured to evaluate the model by using only dice coefficients as the global metrics, so as to obtain the plurality of error data sets from the test set used in the evaluation, on the basis of the dice coefficients.

Figure 2:
FIG. 2 is a schematic graph in a comparison example illustrating a learning curve for evaluating a model with global metrics.

As a comparison example, according to a publicly-known technique, global metrics monitor the development of a model during a learning process of the model and are often used for a fitting process of a learning curve of the model. FIG. 2 is a schematic graph illustrating a learning curve for evaluating a model by using global metrics in a comparison example. In FIG. 2, the horizontal axis expresses the quantity of data sets as the quantity of samples (a training set) in learning data used for training the model, whereas the vertical axis expresses dice values calculated by evaluating the model. In the present example, the quantity of the data sets in the training set is 150 at most, while the quantity of the data sets in the test set is 50.

In this situation, in FIG. 2, a line graph L1 is a learning curve from the training set. Each of the nodes of the graph indicates a dice value obtained by the model that learned while using data sets from the training set in a quantity corresponding to the node on the horizontal axis. The curve drawn with the dotted line is a fitted curve of a logarithmic curve of the line graph L1 and indicates a tendency of the learning curve. As observed from the tendency, the larger the quantity of the data sets (the quantity of the samples) in the training set used for training the model, the more excellent model is obtained.

Further, in FIG. 2, another line graph L2 is a learning curve generated on the basis of the test set. Each of the nodes of the graph indicates a dice value obtained by testing the model generated at a corresponding node of the line graph L1 by using data sets in a quantity in a fixed test set. The curve drawn with the dotted line is a fitted curve of a logarithmic curve of the line graph L2 and indicates a tendency of the learning curve. When a test set including a plurality of data sets like the learning curve is used, it is possible to use an average value of dice values corresponding to the data sets, as the dice value of the entire model. As for a test result using the model, it is generally considered that the closer the dice value of the learning curve is to 1, the more accurate are the results from the model.

As observed from FIG. 2, the dice values of the test set are smaller than the dice values of the training set. It is possible to realize the testing of the model, by inputting the test set of the learning data to the model, so as to calculate the dice values that compare similarity between the output results of the model with correct answer segmentation results from the test set. This is a commonly-used method by which the global metrics are used for testing the model.

It should be noted, however, that global metrics may also be used for evaluating a single data set. In the present embodiment, it is possible to recognize differences and a distribution of the individual data sets in the test set, by evaluating a single data set among the plurality of data sets in the test set while using the global metrics. As a result, the evaluating function 20 is configured to determine, from among the data sets in the test set, data sets in a part exhibiting a relatively large difference between a model output result obtained when the global metrics are used and a correct answer segmentation result, as the error data sets. For example, a threshold value for the dice values may be set in advance, so that the evaluating function 20 calculates, by inputting a certain data set from among the plurality of data sets in the test set to the model, a dice value based on a model output result and a correct answer segmentation result from the data sets, so as to determine data sets of which the calculated dice values are lower than the threshold value set for the dice values, as the error data sets.

Figure 3:
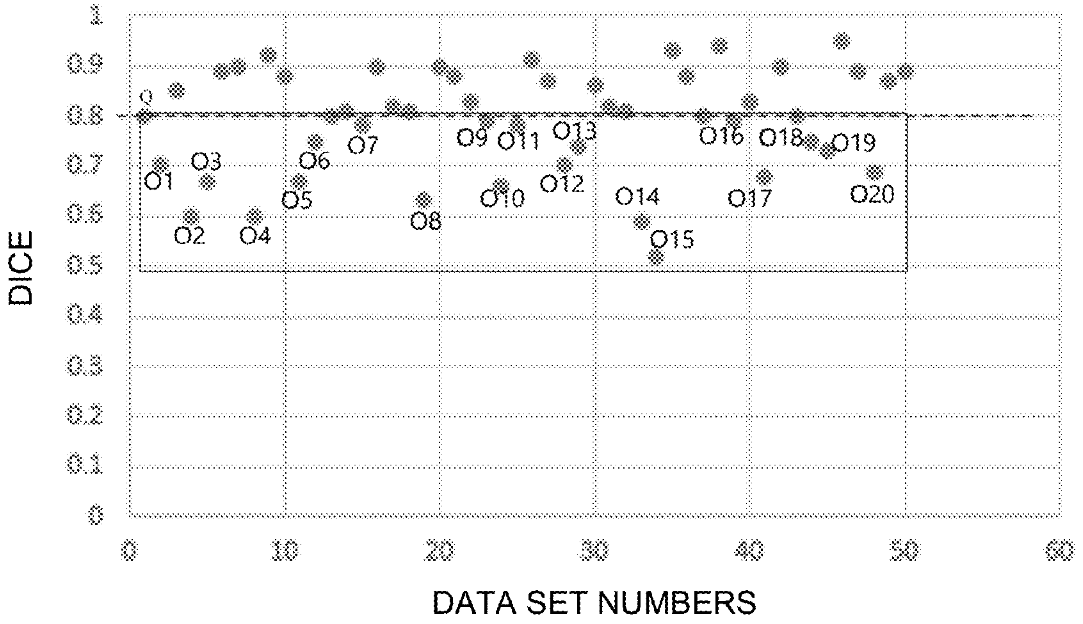
FIG. 3 is a schematic graph illustrating an example of a distribution of error data sets.

FIG. 3 is a schematic graph illustrating an example of a distribution of the error data sets. In this situation, for the sake of convenience in the explanation, an example will be explained in which a test set again includes 50 data sets. The 50 data sets are numbered from 1 to 50. As illustrated in FIG. 3, the horizontal axis expresses the numbers of the data sets, whereas the vertical axis expresses the dice values of the corresponding data sets. Each of the dice values indicates similarity between a segmentation result output by the model when the data set identified with the number is input to the model and the correct answer segmentation result of the data set. For example, the first point Q on the horizontal axis in FIG. 3 represents the data set identified with number 1 of which the dice value is 0.8. All the data sets are expressed as points in the graph in this manner, so as to form a distribution chart with the points as illustrated in FIG. 3. Each of the points represents a data set.

In this situation, when the threshold value for the dice values is set to “0.8”, a dice value smaller than “0.8” is considered as an outlier. In the following sections, data sets each having an outlier will be referred to as error data sets. In the example in FIG. 3, the dice values below the dotted line indicating the threshold value “0.8” are outliers, and the data sets each having an outlier are the error data sets. For example, in FIG. 3, there are 20 error data sets in total, which are numbered as O1 to O20.

As explained above, the evaluating function 20 is configured to obtain the plurality of error data sets, by calculating the dice value of each of the data sets in the test set and comparing the calculated results with the threshold value.

In the present example, it is assumed that the evaluating function 20 is configured to perform the evaluation by using all the data sets in the test set; however, it is also acceptable to perform the evaluation by using a part of the plurality of data sets in the test set.

Next, a process performed by the grouping function 30 in the model training device 100 according to the first embodiment will be explained.

The grouping function 30 is configured to obtain a plurality of error data set groups, by grouping the plurality of error data sets obtained by the evaluating function 20, while using local metrics.

The local metrics are metrics used for evaluating local parts of a model output result (e.g., the labeling of the medical images) and may be referred to as local evaluation metrics. Local metrics that are commonly used in the field of medical image segmentation are matching metrics related to local contours. More specifically, the local metrics are local contour matching metrics indicating a difference between a local contour in an output result obtained by inputting a data set to the model and a local contour in a correct answer segmentation result of the data set. For instance, examples of the local metrics include spatial distance metrics such as a Hausdorff Distance or a Mahalanobis Distance indicating a distance between two local contours. These metrics are both capable of locally evaluating errors of the model. As a result of the grouping function 30 calculating the local metrics and comparing the local metrics with a reference level being set, it is possible to obtain a local evaluation such as a local oversegmentation or a local undersegmentation.

Returning to the description of FIG. 1B, in the first embodiment, the grouping function 30 includes a segmenting function 31, a subregion separating function 32, a local metrics calculating function 33, and an error data set grouping function 34.

The segmenting function 31 is configured to segment the medical images corresponding to the error data sets obtained by the evaluating function 20, so as to make it possible to distinguish a positional relationship between a detection target site serving as a detection target and other sites positioned adjacent to the detection target site in the medical images. More specifically, the segmenting function 31 performs a low-resolution multi-organ segmentation on the error data sets. In the present situation, three-dimensional medical images taken of the liver serving as a detection target are used as an example. Thus, the segmenting function 31 is configured to segment three-dimensional volume data including a liver part into multiple organs, according to the abovementioned multi-organ segmentation method, so as to obtain a segmentation image distinguishing the positions of the multiple organs.

Subsequently, the subregion separating function 32 is configured to separate a boundary region of the liver being the detection target into a plurality of subregions in accordance with the plurality of other adjacent sites. More specifically, the subregion separating function 32 is configured to separate the boundary of the liver positioned adjacent to the different organs into the plurality of subregions.

A standard of the separation may be determined in accordance with types of adjacent organs that have a possibility of impacting the detection target. For example, because the segmentation of the liver has a possibility of being impacted by the adjacent organs such as the stomach, the pancreas, the duodenum, the heart, the diaphragm, the spleen, the colon, muscles, and the esophagus, the separation may be performed in accordance with the impacting organs. Alternatively, it is also possible to perform the separation by selecting a number of important adjacent organs from among the impacting organs.

FIGS. 4A to 4D are drawings illustrating examples of the subregion separation according to the first embodiment. In FIGS. 4A to 4D, three-dimensional volume data is presented separately as a plurality of slices. The subregion separation and the local metrics calculation may be performed with respect to each of the slices, so that volume data is subsequently reconstructed from the slices on which the separation has been performed.

Figure 4A:
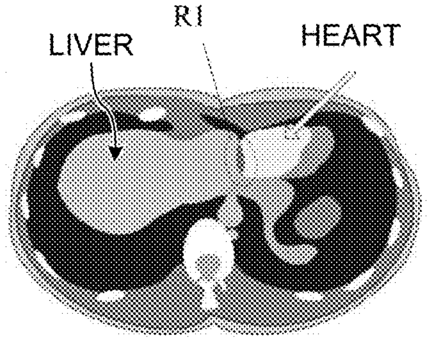
FIG. 4A is a drawing illustrating an example of a subregion separation according to the first embodiment.
Figure 4B:
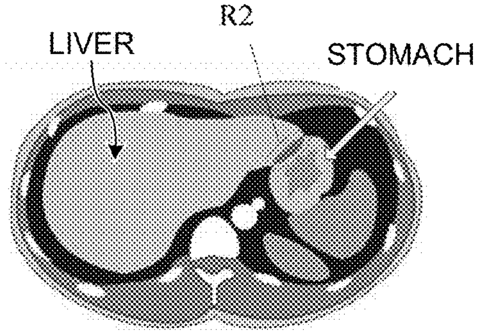
FIG. 4B is a drawing illustrating another example of a subregion separation according to the first embodiment.
Figure 4C:
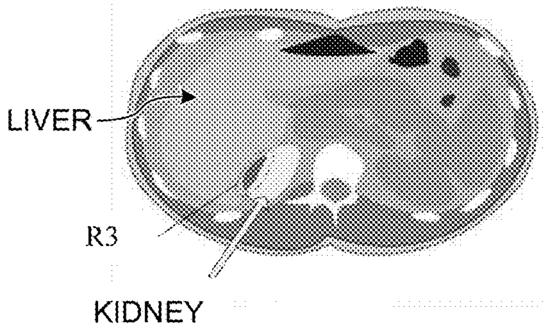
FIG. 4C is a drawing illustrating yet another example of a subregion separation according to the first embodiment.
Figure 4D:
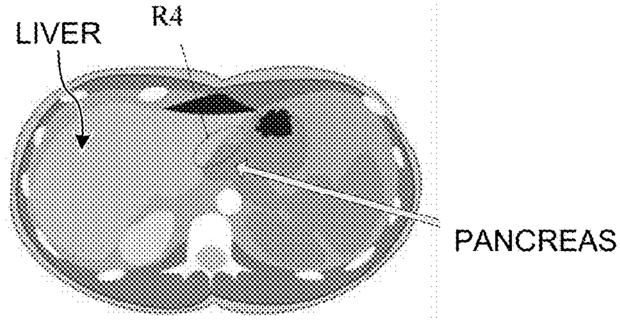
FIG. 4D is a drawing illustrating yet another example of a subregion separation according to the first embodiment.

The boundary region enclosed by the dotted line in FIG. 4A is a boundary region in which the liver and the heart are positioned adjacent to each other. The subregion separating function 32 separates the boundary region as a subregion R1. Further, the boundary region enclosed by the dotted line in FIG. 4B is a boundary region in which the liver and the stomach are positioned adjacent to each other. The subregion separating function 32 separates the boundary region as a subregion R2. The boundary region enclosed by the dotted line in FIG. 4C is a boundary region in which the liver and a kidney are positioned adjacent to each other. The subregion separating function 32 separates the boundary region as a subregion R3. The boundary region enclosed by the dotted line in FIG. 4D is a boundary region in which the liver and the pancreas are positioned adjacent to each other. The subregion separating function 32 separates the boundary region as a subregion R4. In the examples in FIGS. 4A to 4D, the four subregions R1, R2, R3, and R4 are separated by using the heart, the stomach, the kidney, and the pancreas, which are positioned adjacent to the liver. Further, FIGS. 4A to 4D present only one slice for each of the subregions. Thus, the separation results are pieces of volume data including the slices of mutually the same type.

Alternatively, it is also acceptable to completely separate the boundary of the liver, by setting a subregion R4 at another boundary other than the subregions R1, R2, and R3.

Figure 5A:
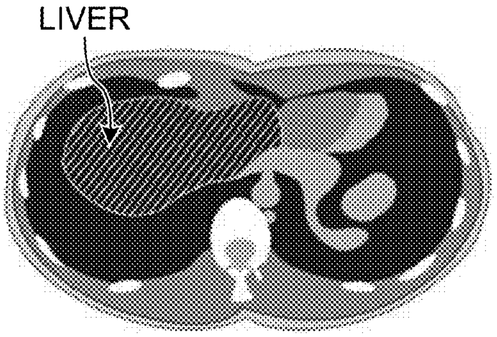
FIG. 5A is a schematic drawing illustrating an evaluation of a subregion segmentation result according to the first embodiment.
Figure 5B:
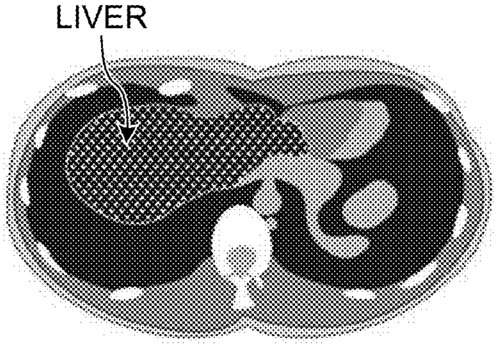
FIG. 5B is a schematic drawing illustrating an evaluation of another subregion segmentation result according to the first embodiment.
Figure 5C:
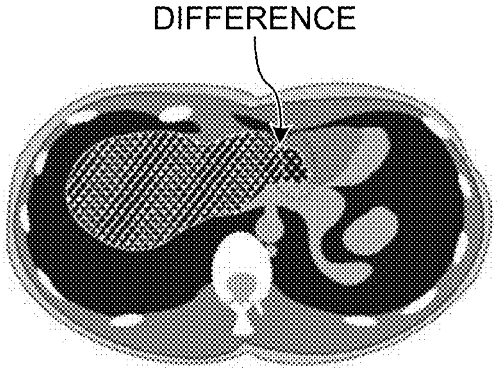
FIG. 5C is a schematic drawing illustrating an evaluation of yet another subregion segmentation result according to the first embodiment.

Subsequently, with respect to each of the subregions, the local metrics calculating function 33 is configured to calculate a local metric of the error data set. In the present situation, an example will be explained with reference to FIGS. 5A to 5C in which an HD value indicating a distance between two local contours is calculated as a local metric. FIGS. 5A to 5C are schematic drawings illustrating evaluations of subregion segmentation results according to the first embodiment. FIG. 5A illustrates a correct answer segmentation result (a ground truth) of the liver of a certain error data set O (e.g., an error data set among the error data sets O1 to O20 in FIG. 3). The part indicated with the diagonal hatching in FIG. 5A is a segmented liver part. In contrast, FIG. 5B illustrates a segmentation result of the liver that is output as a result of inputting the image data of the same error data set O to the model generated by the training function 10. The part indicated with the dotted hatching in FIG. 5B is a liver part in a segmentation result output by the model. FIG. 5C illustrates the difference in the segmentation between FIGS. 5A and 5B regarding the subregion R1. In other words, for the subregion R1, the difference is present as indicated by the area enclosed by the dotted line circle in FIG. 5C, between the ground truth of the error data set O and the model output result. The local metrics calculating function 33 thus calculates a sum of the distances indicated by HD values in the difference section as a local metric of the error data set O. Further, the local metrics calculating function 33 performs the same calculation with respect to the other subregions, so as to calculate a local metric of each of the subregions, with respect to each of the error data sets.

After that, the error data set grouping function 34 is configured to group the plurality of error data sets, on the basis of the subregions separated by the subregion separating function 32 and the local metrics calculated by the local metrics calculating function 33. More specifically, the error data set grouping function 34 is configured to organize certain error data sets satisfying a predetermined condition into one group.

For example, in the example of segmenting the liver explained above, the error data set grouping function 34 is configured to organize certain error data sets having mutually the same evaluation result regarding mutually the same subregion, into one group. More specifically, the error data set grouping function 34 is configured to determine, with respect to each of the subregions, whether the subregion is oversegmented or undersegmented, by comparing the local metric of the subregion with a threshold value. After that, with respect to each of the subregions, the error data set grouping function 34 organizes error data sets each including an oversegmented subregion into a group and organizes error data sets each including an undersegmented subregion into another group.

When the plurality of error data sets are the error data sets O1 to O20 illustrated in FIG. 3, the error data set grouping function 34 compares the absolute value $|D|$ of a local metric D of the respective subregion in each of the error data sets with an oversegmentation threshold value T1 and with an undersegmentation threshold value T2 that have been set, the local metric D having been calculated by the local metrics calculating function 33. In this situation, when the comparison result indicates $D>0$ and $|D|>T1$, the error data set grouping function 34 determines that the evaluation result of the subregion is an oversegmentation. In contrast, when the comparison result indicates $D<0$, and $|D|>T2$, the error data set grouping function 34 determines that the evaluation result of the subregion is an undersegmentation. By individually evaluating the segmentation results of the model with respect to the respective subregion of each of the error data sets in this manner, it is possible to organize the plurality of error data sets into a plurality of groups. Accordingly, the error data sets in each of the groups include the subregions in mutually the same category having mutually the same evaluation. Further, in this situation, the oversegmentation threshold value T1 and the undersegmentation threshold value T2 may be mutually the same value or may be mutually-different values.

FIG. 6 is a table illustrating an example of an error data set grouping process according to the first embodiment. When the plurality of error data sets are the error data sets O1 to O20 illustrated in FIG. 3, the grouping process is performed as illustrated in FIG. 6, for example. In FIG. 6, the grouping process is performed on the four subregions R1, R2, R3, and R4, so as to organize the error data sets O1 to O20 into eight groups.

For example, when the subregion R1 in each of all the medical images of the error data sets O7, O9, O11, and O16 is determined to be oversegmented, the error data set grouping function 34 organizes a group made up of the error data sets O7, O9, O11, and O16 each including the oversegmented subregion R1 as "group 1". As another example, when the subregion R1 in each of all the medical images of the error data sets O6, O12, and O13 is determined to be undersegmented, the error data set grouping function 34 organizes a group made up of the error data sets O6, O12, and O13 each including the undersegmented subregion R1 as "group 2".

For example, when the subregion R2 in each of all the medical images of the error data sets O1, O3, and O5 is determined to be oversegmented, the error data set grouping function 34 organizes a group made up of the error data sets O1, O3, and O5 each including the oversegmented subregion R2 as "group 3". As another example, when the subregion R2 in each of both of the medical images of the error data sets O17 and O14 is determined to be undersegmented, the error data set grouping function 34 organizes a group made up of the error data sets O17 and O14 each including the undersegmented subregion R2 as "group 4".

For example, when the subregion R3 in each of both of the medical images of the error data sets O2 and O4 is determined to be oversegmented, the error data set grouping function 34 organizes a group made up of the error data sets O2 and O4 each including the oversegmented subregion R3 as "group 5". As another example, when the subregion R3 in each of both of the medical images of the error data sets O8 and O18 is determined to be undersegmented, the error data set grouping function 34 organizes a group made up of the error data sets O8 and O18 each including the undersegmented subregion R3 as "group 6".

For example, when the subregion R4 in each of both of the medical images of the error data sets O15 and O10 is determined to be oversegmented, the error data set grouping function 34 organizes a group made up of the error data sets O15 and O10 each including the oversegmented subregion R4 as "group 7". As another example, when the subregion R4 in each of both of the medical images of the error data sets O19 and O20 is determined to be undersegmented, the error data set grouping function 34 organizes a group made up of the error data sets O19 and O20 each including the undersegmented subregion R4 as "group 8".

The grouping process in FIG. 6 is merely an example, and the present embodiment is not limited to this example. For instance, one error data set may be organized into two groups at the same time because of including a subregion of which two local metrics are error. Further, the grouping process may be performed by using a plurality of subregions in combination. As long as the local metrics thereof satisfy the predetermined condition, certain error data sets can be organized into one group.

Next, a process performed by the model training information specifying function 40 of the model training device 100 according to the first embodiment will be explained.

The model training information specifying function 40 is configured to specify model training information to be used by the training function 10 to train the model, with respect to each of the error data set groups resulting from the grouping process of the grouping function 30.

As a result of the grouping process performed by the grouping function 30, the data sets that were originally scattered have been organized into the plurality of error data set groups each having mutually the same characteristics. By acquiring the characteristic of each of the error data set groups and specifying the characteristics as the model training information, the model training information specifying function 40 is able to output the specified model training information through the output interface 120. The characteristics of the error data set groups specified by the model training information specifying function 40 may be a rule used in the grouping process or may be the characteristics in common that are obtained by forming the groups and subsequently analyzing the plurality of data sets in the groups. The characteristics of the error data set groups may be image-related characteristics, anatomical characteristics, or pathological characteristics. In other words, the model training information specifying function 40 is configured to specify at least one selected from among the image-related characteristics, the anatomical characteristics, and the pathological characteristics with respect to each of the error data set groups, as the model training information.

FIG. 7 is a table illustrating examples of the characteristics of the error data set groups output by the model training information specifying function 40 according to the first embodiment. As presented in the table of FIG. 7, with respect to each of the error data set groups "group 1" to "group 8", the characteristics of the medical images in the group are individually analyzed. FIG. 7 illustrates image-related characteristics and pathological characteristics as examples. For instance, the error data set group identified as "group 1" has, as a whole, image-related characteristics I1, I2, and I3 and pathological characteristics P1 and P2. The error data set group identified as "group 2" has, as a whole, image-related characteristics I4, I5, and I6 and a pathological characteristic P3. Explanations of the characteristics of the other groups will be omitted.

Possible types of the characteristics are not limited to the examples listed in FIG. 7. For instance, the image-related characteristics may be an acquisition protocol, an imaging artifact (e.g., a metal artifact in CT data, a dynamic artifact in MR), a breath holding state, a partial volume effect (the thickness of the slice), or the like. For instance, the pathological characteristics may be liver fat, iron deposits, fiberization, a tumor, or the like.

On the basis of the abovementioned characteristics specified as the model training information by the model training information specifying function 40, the model training device 100 is able to implement the learning process while narrowing a focus, at the time of generating the model specialized in a specific purpose by using the learning data including the abovementioned error data set groups. For example, the training function 10 is able to train a new model by acquiring a data set having the same characteristics on the basis of the characteristic of an error data set group and further combining the newly-acquired data set with the abovementioned error data set group. In this situation, the results output by the model with respect to the medical images having those characteristics have a higher level of precision.

Figure 8A:
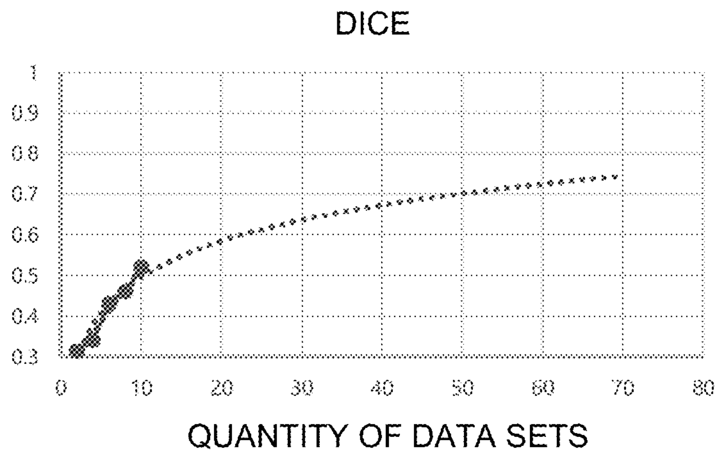
FIG. 8A is a schematic graph illustrating a prediction of a learning curve for each error data set group according to the first embodiment.
Figure 8B:
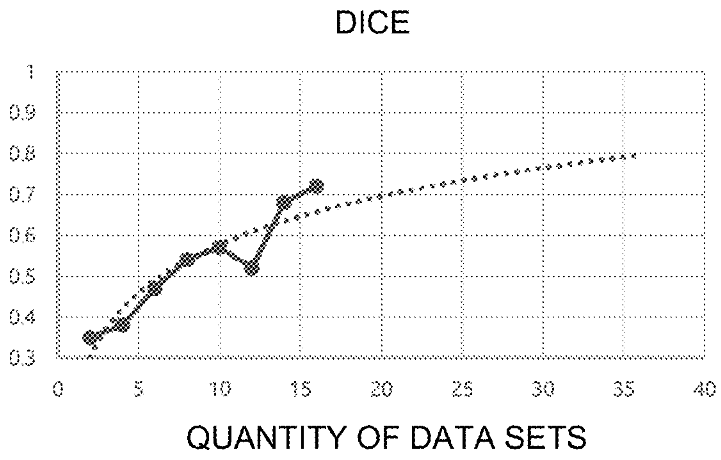
FIG. 8B is another schematic graph illustrating the prediction of the learning curve for each error data set group according to the first embodiment.

Further, with respect to each of the error data set groups, the model training information specifying function 40 is also capable of specifying the model training information by predicting the quantity of the data sets or the precision level of the model required to train the model. For example, with respect to each of the error data set groups, the model training information specifying function 40 is configured to perform a learning curve fitting process on the model, by testing a model (corresponding to the initial learning model) generated by the training function 10 while using a set made up of the data sets included in the error data set group as learning data (a test set). As a result, the model training information specifying function 40 is able to specify the model training information by predicting the quantity of the data sets (the quantity of pieces of learning data to be acquired) or the precision level of the model required to construct a model corresponding to the characteristic of the error data set group, on the basis of the learning curve resulting from the fitting process. FIGS. 8A and 8B are schematic graphs each illustrating the prediction of a learning curve for each of the error data set groups according to the first embodiment.

FIG. 8A presents a learning curve at the time of testing (evaluating) a model at mutually-different stages (having mutually-different quantities of data sets in the training set) generated by the training function 10 in FIG. 2, while using "group 1" in the table of FIG. 7 as a test set. As illustrated in FIG. 8A, the curve indicated with the dotted line is obtained by performing a fitting process on the learning curve of "group 1". From the tendency of the curve obtained in the fitting process, it is observed that when the quantity of the data sets (i.e., the quantity of the samples) used for training the model reaches 70, the dice value exhibits a relatively high precision level such as approximately 0.75. Further, because the data sets used in the test have the characteristics such as the image-related characteristics I1, I2, and I3 and the pathological characteristics P1 and P2, the training set needs to include at least 70 data sets, in order to obtain, through the training, a model having relatively high precision (having a dice value that reaches 0.75) for the characteristics I1, I2, I3, P1, and P2. As a result of the model training information specifying function 40 specifying the ideal quantity of the data sets as the model training information and outputting the specified model training information through the output interface 120, the training function 10 is able to train the model, by additionally acquiring learning data (data sets) on the basis of the model training information and having the learning data learned.

Further, FIG. 8B presents a learning curve at the time of testing (evaluating) a model at mutually-different stages (having mutually-different quantities of data sets in the training set) generated by the training function 10 in FIG. 2, while using "group 2" in the table of FIG. 7 as a test set. As illustrated in FIG. 8B, the curve indicated with the dotted line is obtained by performing a fitting process on the learning curve of "group 2". From the tendency of the curve obtained in the fitting process, it is observed that when the quantity of the data sets used for training the model reaches 35, the dice value exhibits a relatively high precision level such as approximately 0.8. Further, because the data sets used in the test have the characteristics such as the image-related characteristics I4, I5, and I6 and the pathological characteristic P3, the training set needs to include at least 35 data sets, in order to obtain, through the training, a model having relatively high precision (having a dice value that reaches 0.8) for the characteristics I4, I5, I6, and P3. As a result of the model training information specifying function 40 specifying the ideal quantity of the data sets as the model training information and outputting the specified model training information through the output interface 120, the training function 10 is able to train the model, by additionally acquiring learning data (data sets) on the basis of the model training information and having the learning data learned.

Further, the model training device 100 is also able to train a model, by similarly grouping a training set while using the model training information output by the model training information specifying function 40 as a grouping rule and further using the grouped training set. In that situation, the training function 10 is configured to acquire, with respect to each of the plurality of error data set groups, learning data corresponding to the characteristic of the error data set group on the basis of the model training information, so as to generate a plurality of learning models respectively corresponding to the characteristics of the plurality of error data set groups. As a result, the model training device 100 is able to obtain the models having higher levels of precision for the corresponding characteristics of the groups.

Further, when the training set is also similarly grouped, it is also acceptable to test a corresponding model by using a corresponding error data set group as a test set. As a result, it is possible to predict the quantity of the data sets required to train each of the groups resulting from the grouping process, so as to perform a supplementary acquisition or the like for each group.

Further, the global metrics and the local metrics used in the above description are not limited to the examples explained above. It is possible to use different global metrics and local metrics for a different type of medical images or a different detection target. It is acceptable to use arbitrary global metrics and local metrics as long as it is possible to comprehensively evaluate or locally evaluate variances in the model output results from the medical images.

Figure 9:
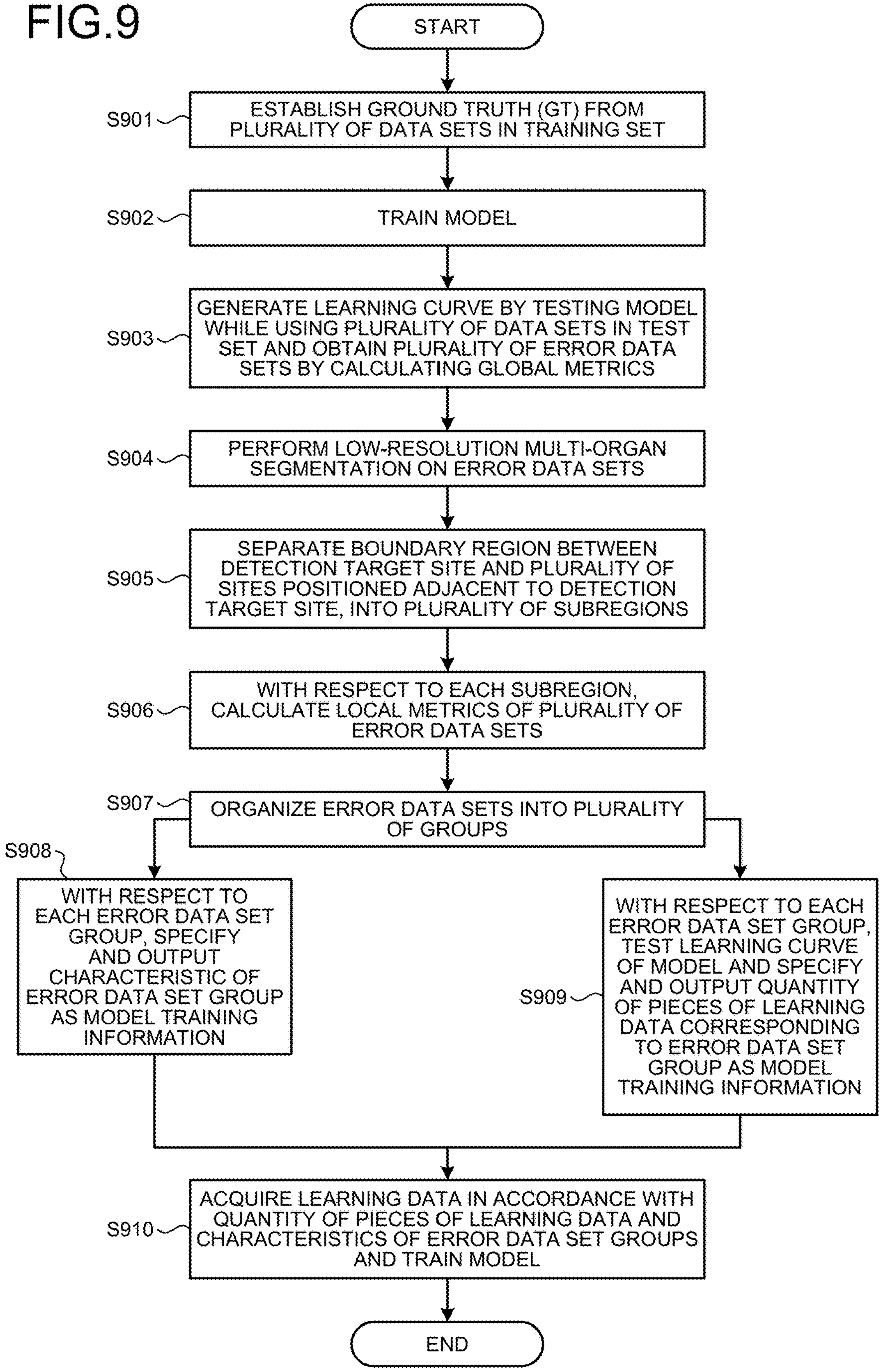
FIG. 9 is a flowchart for explaining a process performed by the model training device according to the first embodiment.

In the following sections, a process performed by the model training device 100 according to the first embodiment will be explained. FIG. 9 is a flowchart for explaining the process performed by the model training device 100 according to the first embodiment.

To begin with, the training function 10 acquires a training set and a test set each including a plurality of data sets of medical images taken of the abdomen and establishes a Ground Truth (GT) from a plurality of pieces of data sets in the training set (step S901), so as to train a model (step S902).

At steps S901 and S902, at the same time as the training function 10 trains the model by gradually inputting the plurality of data sets from the training set, the evaluating function 20 generates a learning curve of the model, by testing the generated model at mutually-different stages, while using the plurality of data sets in the test set. Further, the evaluating function 20 calculates a global metric (e.g., a dice value in the present embodiment) with respect to each of the plurality of data sets in the test set, so as to obtain a plurality of error data sets each having an outlier, from among the plurality of data sets in the test set (step S903).

After that, in the grouping function 30, the segmenting function 31 performs a low-resolution multi-organ segmentation on the plurality of error data sets obtained by the evaluating function 20 (step S904). Subsequently, within the medical images included in the plurality of error data sets, the subregion separating function 32 separates, while using the liver as a detection target site, each of the boundary regions between the detection target site and the plurality of sites positioned adjacent to the detection target site into a plurality of subregions (step S905). After that, with respect to the plurality of error data sets, the local metrics calculating function 33 calculate a local metric for each of the subregions (step S906). Subsequently, the error data set grouping function 34 obtains a plurality of error data set groups by grouping the plurality of error data sets, on the basis of the subregions separated by the subregion separating function 32 and the local metrics calculated by the local metrics calculating function 33. In other words, the error data set grouping function 34 organizes the error data sets into the plurality of groups (step S907).

After that, with respect to each of the error data set groups resulting from the grouping process of the grouping function 30, the model training information specifying function 40 specifies model training information to be used by the training function 10 to train the model. For example, with respect to each of the error data set groups resulting from the grouping process of the grouping function 30, the model training information specifying function 40 specifies the characteristic of the error data set group as the model training information and further outputs the specified model training information through the output interface 120 (step S908). Further, for example, with respect to each of the error data set groups, the model training information specifying function 40 specifies, as the model training information, the quantity of pieces of learning data (the quantity of the data sets) required to generate a model corresponding to the characteristic of the error data set group, by testing the model while using a set made up of the data sets included in the error data set group as a test set and further outputs the specified model training information through the output interface 120 (step S909). After that, the training function 10 trains the model by additionally acquiring learning data (data sets) on the basis of the model training information and having the learning data learned (step S910).

As explained above, in the model training device 100 according to the first embodiment, the evaluating function 20 is configured to obtain the data sets used for evaluating the model by using the global metrics. The grouping function 30 is configured to group the data sets by using the local metrics. The model training information specifying function 40 is configured to obtain the model training information that is more suitable for the detection target. Accordingly, it is possible to provide the more accurate model by additionally acquiring the learning data. Consequently, when the model training device 100 according to the first embodiment is used, the data acquisition has targetability and high efficiency. It is therefore possible to reduce the time and costs of the labeling of the medical images. In addition, in the model training device 100 according to the first embodiment, the model training information specifying function 40 is configured to specify, as the model training information, the characteristic of each of the error data set groups and the quantity of the pieces of learning data being required, so that the training function 10 trains the model by additionally acquiring the learning data (the data sets) on the basis of the model training information and having the learning data learned. Consequently, it is possible to enhance the precision level of the model trained in this manner.

Second Embodiment

A second embodiment will be explained, with reference to FIGS. 10 to 14. As a primary difference from the first embodiment, the model training device 100 according to the second embodiment uses a different grouping method in the grouping function. In the following sections, differences from the first embodiment will be explained in the second embodiment. Explanations that are duplicates of the first embodiment will be omitted.

Figure 10:
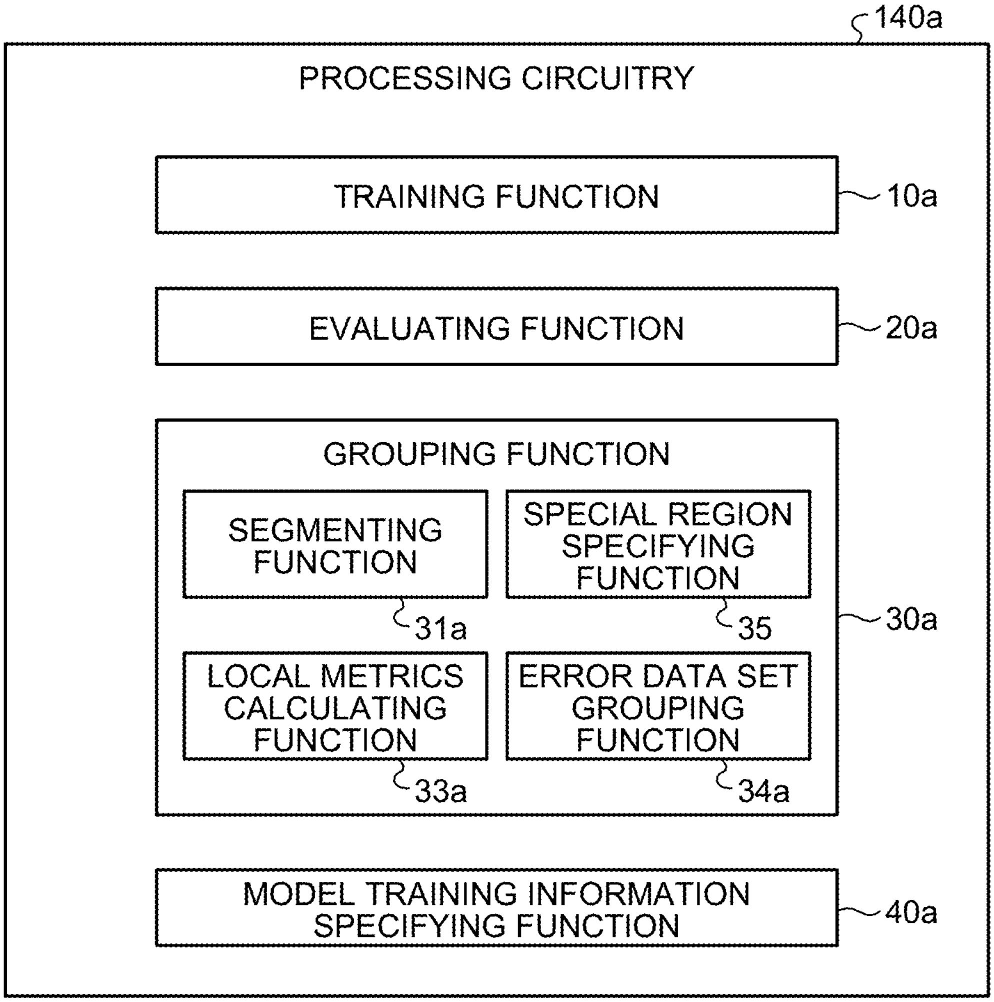
FIG. 10 is a block diagram illustrating an exemplary functional configuration of processing circuitry of a model training device according to a second embodiment.

FIG. 10 is a block diagram illustrating an exemplary functional configuration of processing circuitry 140*a* of the model training device 100 according to the second embodiment. As illustrated in FIG. 10, the processing circuitry 140*a* is configured to implement a training function 10*a*, an evaluating function 20*a*, a grouping function 30*a*, and a model training information specifying function 40*a*.

To begin with, a process performed by the training function 10*a* of the model training device 100 according to the second embodiment will be explained.

For example, the training function 10*a* is configured to train a model that extracts characteristics of the liver from an abdomen image (a medical image taken of the abdomen) and performs a subsegment segmentation, by learning a plurality of existing data sets as learning data. As a result of the characteristic extraction and the subsegment segmentation, for example, an image region representing the liver being a site serving as a detection target is extracted from the abdomen image, so as to segment, within the abdomen image, the liver serving as the detection target site and subsegment sites such as organs positioned adjacent to the liver, lung lobes, blood vessels, nodules, and the like. In the present example, for instance, the training function 10*a* extracts the image region representing the liver serving as the detection target site and further segments the subsegment sites such as the adjacent organs of the liver as well as blood vessels, nodules, and the like in the liver, by using a brightness value distribution of the abdomen image.

Next, a process performed by the evaluating function 20*a* of the model training device 100 according to the second embodiment will be explained.

The evaluating function 20*a* is configured to evaluate the model generated by the training function 10*a* by using the global metrics, so as to obtain, as error data sets, a plurality of data sets each having an outlier, from among the plurality of data sets in a test set used in the evaluation. More specifically, while the training function 10*a* is generating the model by gradually inputting the plurality of data sets from the training set, the evaluating function 20*a* is configured to generate a learning curve of the model, by testing the generated model at mutually-different stages, while using the plurality of data sets in the test set. Further, the evaluating function 20*a* is configured to obtain the plurality of error data sets from the test set, by calculating a global metric with respect to each of the plurality of data sets in the test set. In other words, the method for obtaining the error data sets is the same as that in the first embodiment. Thus, detailed explanations of the evaluating function 20*a* will be omitted.

Next, a process performed by the grouping function 30*a* of the model training device 100 according to the second embodiment will be explained.

The grouping function 30*a* is configured to obtain a plurality of error data set groups by grouping the plurality of error data sets obtained by the evaluating function 20*a*, while using local metrics.

More specifically, in the second embodiment, the grouping function 30*a* includes a segmenting function 31*a*, a special region specifying function 35, a local metrics calculating function 33*a*, and an error data set grouping function 34*a*.

The segmenting function 31*a* is configured to segment the medical images corresponding to the error data sets obtained by the evaluating function 20*a*, so as to make it possible to distinguish regions having mutually-different image characteristics within the detection target site serving as a detection target. More specifically, the segmenting function 31*a* is configured to perform a low-resolution characteristic extraction and a subsegment segmentation on the error data sets. In the present situation, three-dimensional medical images taken of the liver serving as a detection target are used as an example. Accordingly, the segmenting function 31*a* segments three-dimensional volume data including a liver part according to the characteristic extraction method and the subsegment segmentation method described above, so as to obtain a segmentation image in which, as the characteristics inside the liver, the subsegment sites such as blood vessels, nodules, and the like are segmented into a plurality of regions.

From among the regions having the mutually-different image characteristics, the special region specifying function 35 is configured to specify a region having a specific characteristic as a special region. For example, a region suspected to be a lesion may be determined as the special region.

Figure 11A:
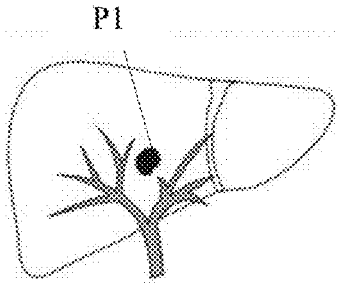
FIG. 11A is a drawing illustrating an example of a lesion region separation according to the second embodiment.
Figure 11B:
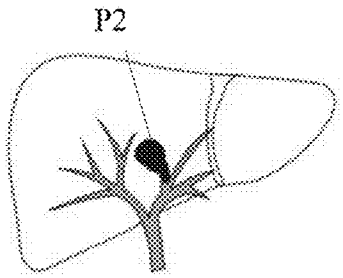
FIG. 11B is a drawing illustrating another example of a lesion region separation according to the second embodiment.
Figure 11C:
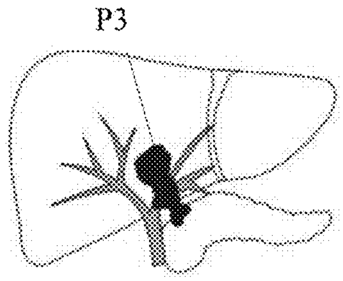
FIG. 11C is a drawing illustrating yet another example of a lesion region separation according to the second embodiment.
Figure 11D:
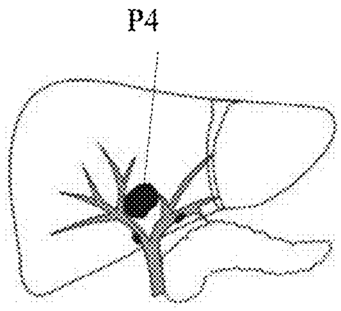
FIG. 11D is a drawing illustrating yet another example of a lesion region separation according to the second embodiment.

FIGS. 11A to 11D are drawings illustrating examples of a lesion region separation according to the second embodiment. As illustrated in FIGS. 11 to 11D, a region having a characteristic of a nodule (the block-like shadow part in the drawings) in the liver may be determined as a special region. Further, it is also possible to distinguish a plurality of special regions, by using differences in the characteristics among the special regions.

In FIGS. 11A to 11D, a nodule is separated into a plurality of lesion sites according to characteristics of the nodule. In the example in FIG. 11A, a block-like shadow is within the liver and has not spread to blood vessels. Accordingly, the special region specifying function 35 specifies a special region represented by the block-like shadow as a lesion site P1. Further, in the example in FIG. 11B, a block-like shadow is within the liver and has entered a blood vessel. Accordingly, the special region specifying function 35 specifies a special region represented by the block-like shadow as a lesion site P2. In FIG. 11C, a block-like shadow protrudes to the outside of the liver and has spread to an adjacent organ (e.g., the pancreas). Accordingly, the special region specifying function 35 specifies a special region represented by the block-like shadow as a lesion site P3. In FIG. 11D, a block-like shadow has spread to a lymph node. Accordingly, the special region specifying function 35 specifies a special region represented by the block-like shadow as a lesion site P4. The special regions illustrated in FIGS. 11A to 11D are merely examples. It is acceptable to distinguish the special regions according to other rules.

The local metrics calculating function 33*a* is configured to calculate a local metric with respect to each of the special regions. In the present examples, HD values each indicating a distance between two local contours are again used as the local metrics.

Subsequently, the error data set grouping function 34*a* is configured to group the error data sets, on the basis of the special regions specified by the special region specifying function 35 and the local metrics calculated by the local metrics calculating function 33*a*. More specifically, the error data set grouping function 34*a* is configured to organize certain error data sets satisfying a predetermined condition into one group.

For example, the error data set grouping function 34*a* is configured to organize certain error data sets having mutually the same segmentation evaluation result in subregions of mutually the same type, into one group. On the basis of the local metrics of the special regions, the error data set grouping function 34*a* is configured to analyze at least one selected from among image-related characteristics, anatomical characteristics, and pathological characteristics of the special regions, so as to organize error data sets of the special regions having mutually the same image-related, anatomical, or pathological characteristic, into a group. More specifically, the error data set grouping function 34*a* is configured to determine, with respect to each of the special regions, whether the special region is oversegmented or undersegmented, by comparing the local metric of the special region with a threshold value. After that, with respect to each of the special regions, the error data set grouping function 34*a* organizes error data sets each including an oversegmented special region into a group and organizes error data sets each including an undersegmented special region into another group.

For example, the error data set grouping function 34*a* compares the absolute value |D| of a local metric D of the respective special region in each of the error data sets with an oversegmentation threshold value T3 and with an undersegmentation threshold value T4 that have been set, the local metric D having been calculated by the local metrics calculating function 33*a*. In this situation, when the comparison result indicates $D>0$ and $|D|>T3$, the error data set grouping function 34*a* determines that the evaluation result of the special region is an oversegmentation. In contrast, when the comparison result indicates $D<0$, and $|D|>T4$, the error data set grouping function 34*a* determines that the evaluation result of the special region is an undersegmentation. By individually evaluating the segmentation results of the model with respect to the respective special region of each of the error data sets in this manner, it is possible to organize the plurality of error data sets into a plurality of groups. Accordingly, the error data sets in each of the groups include the special regions in mutually the same category having mutually the same evaluation. Further, in this situation, the oversegmentation threshold value T3 and the undersegmentation threshold value T4 may be mutually the same value or may be mutually-different values.

FIG. 12 is a table illustrating an example of an error data set grouping process according to the second embodiment. When the plurality of error data sets are the error data sets O1 to O20 illustrated in FIG. 3, the grouping process is performed as illustrated in FIG. 12, for example. In FIG. 12, the grouping process is performed on three lesion sites P1, P2, and P3, so as to organize the error data sets O1 to O20 into six groups.

For example, upon determination that all the medical images of the error data sets O5, O10, O14, O17, and O20 each include the lesion site P1 serving as a special region and that the segmentation of the lesion site P1 is oversegmented in all of these medical images, the error data set grouping function 34*a* organizes a group made up of the error data sets O5, O10, O14, O17, and O20 each including the oversegmented lesion site P1 as "group 1". As another example, upon determination that all the medical images of the error data sets O1, O6, and O9 each include the lesion site P1 serving as a special region and that the segmentation of the lesion site P1 is undersegmented in all of these medical images, the error data set grouping function 34*a* organizes a group made up of the error data sets O1, O6, and O9 each including the undersegmented lesion site P1 as "group 2".

For example, upon determination that all the medical images of the error data sets O7, O11, and O13 each include the lesion site P2 serving as a special region and that the segmentation of the lesion site P2 is oversegmented in all of these medical images, the error data set grouping function 34*a* organizes a group made up of the error data sets O7, O11, and O13 each including the oversegmented lesion site P2 as "group 3". As another example, upon determination that both of the medical images of the error data sets O16 and O18 each include the lesion site P2 serving as a special region and that the segmentation of the lesion site P2 is undersegmented in both of these medical images, the error data set grouping function 34*a* organizes a group made up of the error data sets O16 and O18 each including the undersegmented lesion site P2 as "group 4".

For example, upon determination that all the medical images of the error data sets O2, O3, O4, and O8 each include the lesion site P3 serving as a special region and that the segmentation of the lesion site P3 is oversegmented in all of these medical images, the error data set grouping function 34*a* organizes a group made up of the error data sets O2, O3, O4, and O8 each including the oversegmented lesion site P3 as "group 5". As another example, upon determination that all the medical images of the error data sets O12, O15, and O19 each include the lesion site P3 serving as a special region and that the segmentation of the lesion site P3 is undersegmented in all of these medical images, the error data set grouping function 34*a* organizes a group made up of the error data sets O12, O15, and O19 each including the oversegmented lesion site P3 as "group 6".

The grouping process in FIG. 12 is merely an example, and the present embodiment is not limited to this example. For instance, an error data set may be organized into two groups at the same time because of including two lesion sites. There may be an error data set that is not included in any group because of not including any lesion site or because of having neither an oversegmentation nor an undersegmentation. Further, a plurality of special regions may be combined and grouped together. It is possible to form a group as long as the local metrics of certain error data sets satisfy a predetermined condition.

Next, a process performed by the model training information specifying function 40*a* of the model training device 100 according to the second embodiment will be explained.

With respect to each of the error data set groups resulting from the grouping process of the grouping function 30*a*, the model training information specifying function 40*a* is configured to specify model training information to be used by the training function 10*a* to train the model.

As a result of the grouping process performed by the grouping function 30*a*, the data sets that were originally scattered have been organized into the plurality of error data set groups each having mutually the same characteristics. By acquiring the characteristic of each of the error data set groups and specifying the characteristics as the model training information, the model training information specifying function 40*a* is able to output the specified model training information through the output interface 120.

FIG. 13 is a table illustrating examples of the characteristics of the error data set groups output by the model training information specifying function 40*a* according to the second embodiment. As presented in the table of FIG. 13, with respect to each of the error data set groups "group 1" to "group 6", the characteristics of the medical images in the group are individually analyzed. FIG. 13 illustrates image-related characteristics, anatomical characteristics, and pathological characteristics. For instance, the error data set group identified as "group 1" has, as a whole, image-related characteristics I1, I2, and I3, anatomical characteristics A1 and A2, and pathological characteristics P1 and P2. The error data set group identified as "group 2" has, as a whole, image-related characteristics I4, I5, and I6, anatomical characteristics A3 and A4, and a pathological characteristic P3. Explanations of the characteristics of the other groups will be omitted.

Possible types of the characteristics are not limited to the examples listed in FIG. 13. For instance, the image-related characteristics may be an acquisition protocol, an imaging artifact (e.g., a metal artifact in CT data, a dynamic artifact in MR), breath holding states I1, I2, and I3, a partial volume effect (the thickness of the slice), or the like. For instance, the anatomical characteristics may be a position, a size, or the like. For instance, the pathological characteristics may be a pathological classification and a disease stage, HepatoCellular Carcinoma (HCC), Liver Imaging Reporting and Data System (LI-RADS) for an image diagnosis of hepatocellular carcinoma, or TNM indicating size and spreading of a tumor (T), presence/absence of a metastasis to a lymph node (N), and presence/absence of a metastasis (M).

On the basis of the abovementioned properties specified as the model training information by the model training information specifying function 40*a*, the model training device 100 is able to implement the learning process while narrowing a focus, at the time of generating the model specialized in a specific purpose by using the learning data including the abovementioned error data set groups. For example, the training function 10*a* is able to train a new model by acquiring a data set having the same characteristics on the basis of the characteristic of an error data set group and further combining the newly-acquired data set with the abovementioned error data set group. In this situation, the results output by the model with respect to the medical images having those characteristics have a higher level of precision.

With respect to each of the error data set groups, the model training information specifying function 40*a* is also capable of specifying the model training information by predicting the quantity of the data sets or the precision level of the model required to train the model.

Further, the model training device 100 is also able to train a model, by similarly grouping a training set while using the model training information output by the model training information specifying function 40*a* as a grouping rule and further using the grouped training set. In that situation, the training function 10*a* is configured to acquire, with respect to each of the plurality of error data set groups, learning data corresponding to the characteristic of the error data set group on the basis of the model training information, so as to generate a plurality of models respectively corresponding to the characteristics of the plurality of error data set groups. As a result, the model training device 100 is able to obtain the models having higher levels of precision for the corresponding characteristics of the grouping process.

Further, when the training set is also similarly grouped, it is also acceptable to test a corresponding model by using a corresponding error data set group as a test set. As a result, it is possible to predict the quantity of the data sets required to train each of the groups resulting from the grouping process, so as to perform a supplementary acquisition or the like for each group.

Figure 14:
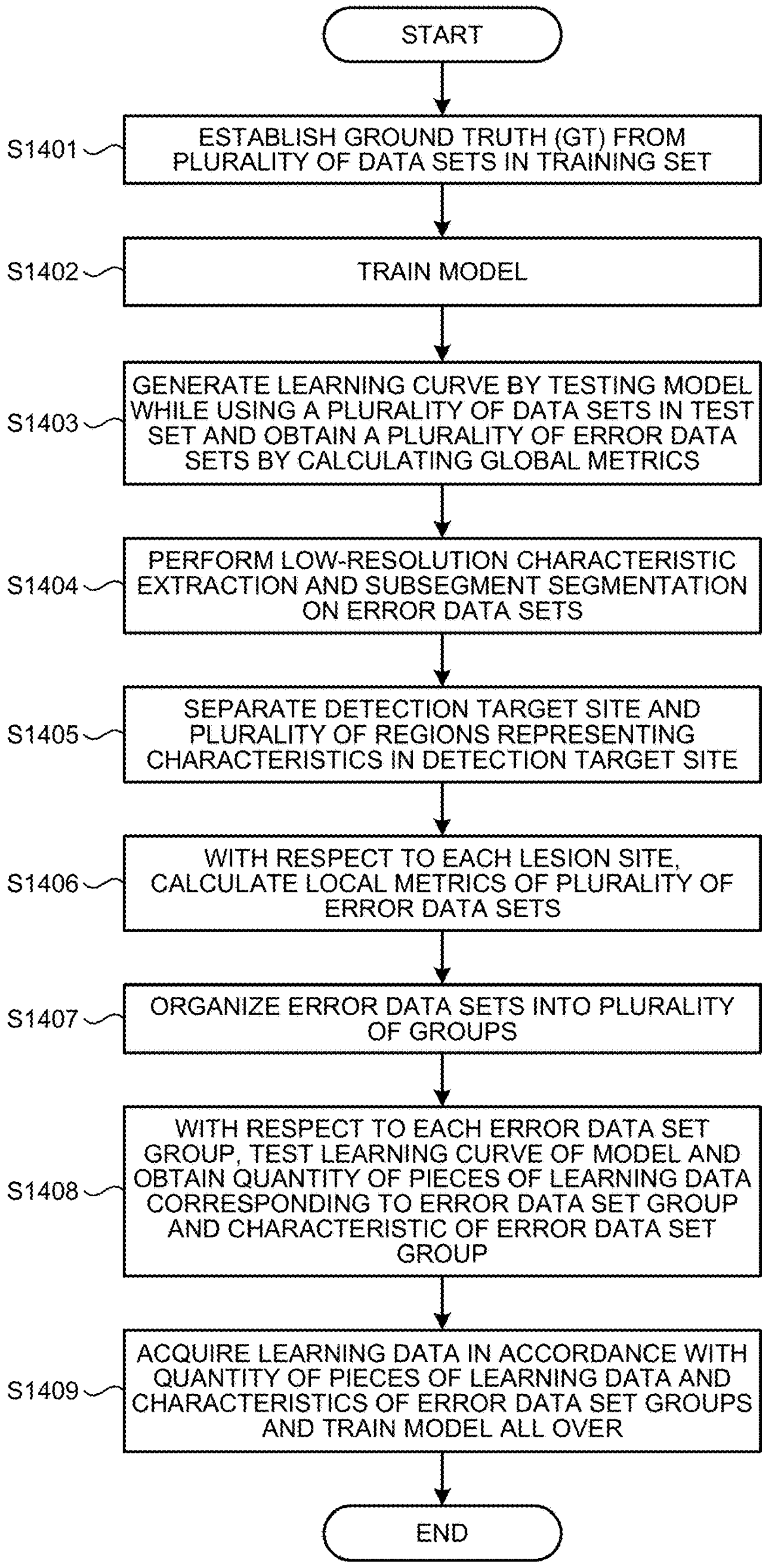
FIG. 14 is a flowchart for explaining a process performed by a model training device according to the second embodiment.

In the following sections, a process performed by the model training device 100 according to the second embodiment will be explained. FIG. 14 is a flowchart for explaining the process performed by the model training device 100 according to the second embodiment.

To begin with, the training function 10*a* acquires a training set and a test set each including a plurality of data sets of medical images taken of the abdomen and establishes a Ground Truth (GT) from a plurality of pieces of data sets in the training set (step S1401), so as to train a model (step S1402).

At steps S1401 and S1402, at the same time as the training function 10*a* trains the model by gradually inputting the plurality of data sets from the training set, the evaluating function 20*a* generates a learning curve of the model, by testing the generated model at mutually-different stages, while using the plurality of data sets in the test set. Further, the evaluating function 20*a* calculates a global metric (e.g., a dice value in the present embodiment) with respect to each of the plurality of data sets in the test set, so as to obtain a plurality of error data sets each having an outlier, from among the plurality of data sets in the test set (step S1403).

After that, in the grouping function 30*a*, the segmenting function 31*a* performs a low-resolution characteristic extraction and a subsegment segmentation on the plurality of error data sets obtained by the evaluating function 20*a*, to segment the medical images included in the plurality of error data sets so as to make it possible to distinguish the detection target site serving as a detection target and the plurality of regions exhibiting the characteristics in the detection target site within the medical images (step S1404). Subsequently, within the medical images included in the plurality of error data sets, the special region specifying function 35 specifies a region having a specific characteristic (a special region) as a lesion site, from among the plurality of regions (step S1405). After that, with respect to the plurality of error data sets, the local metrics calculating function 33*a* calculates a local metric with respect to each of the lesion sites (step S1406). Subsequently, the error data set grouping function 34*a* obtains a plurality of error data set groups by grouping the plurality of error data sets, on the basis of the lesion sites specified by the special region specifying function 35 and the local metrics calculated by the local metrics calculating function 33*a*. In other words, the error data set grouping function 34*a* organizes the error data sets into the plurality of groups (step S1407).

After that, with respect to each of the error data set groups resulting from the grouping process of the grouping function 30*a*, the model training information specifying function 40*a* specifies model training information to be used by the training function 10*a* to train the model. For example, with respect to each of the error data set groups, the model training information specifying function 40*a* specifies, as the model training information, the quantity of pieces of learning data (the quantity of the data sets) and the characteristic of the data set group required to generate a model corresponding to the characteristic of the error data set group, by testing the model while using a set made up of the data sets included in the error data set group as a test set and further outputs the specified model training information through the output interface 120 (step S1408). After that, on the basis of the quantity of the pieces of learning data and the characteristics of the data set groups, the training function 10*a* supplementarily acquires learning data and trains the model all over by having the learning data re-learned (step S1409). In other words, the initial learning model is re-trained.

At the time of re-training the initial learning model, the training function 10*a* is able to train the model all over, by combining the supplementarily-acquired learning data with the original learning data and using the combination as learning data. In an example, it is also acceptable, after the supplementarily-acquired learning data is combined with the original learning data, to perform the same grouping process as performed on the abovementioned error data sets in the training set, while using the characteristics output by the model training information specifying function 40*a* as a grouping rule, so as to individually train a model corresponding to each of the characteristics by using the learning data of each of the groups.

As explained above, in the model training device 100 according to the second embodiment, the evaluating function 20*a* is configured to obtain the data sets used for evaluating the model by using the global metrics. The grouping function 30*a* is configured to group the data sets by using the local metrics. Accordingly, it is possible to obtain the model training information having targetability and high efficiency. It is therefore possible to provide the more accurate estimated quantity by acquiring the learning data and to thus able to reduce the time and costs of the labeling of the medical images. In addition, in the model training device 100 according to the second embodiment, the model training information specifying function 40*a* is configured to specify, as the model training information, the characteristic of each of the error data set groups and the quantity of the pieces of learning data being required, so that the training function 10*a* trains the model by additionally acquiring the learning data (the data sets) on the basis of the model training information and having the learning data learned. Consequently, it is possible to enhance the precision level of the model trained in this manner.

Further, it is also possible to set a local region in accordance with other factors impacting the medical image segmentation such as change densities of the images, signal intensities, structural skewness, imaging conditions, and the like, for example. It is also possible to achieve the abovementioned technical advantageous effects by grouping the error data sets while using a local metric of the local region.

The constituent elements of the devices in the above embodiments are based on functional concepts. Thus, it is not necessarily required to physically configure the constituent elements as indicated in the drawings. In other words, specific modes of distribution and integration of the devices are not limited to those illustrated in the drawings. It is acceptable to functionally or physically distribute or integrate all or a part of the devices in any arbitrary units, depending on various loads and the status of use. Further, all or an arbitrary part of the processes and functions performed by the devices may be realized by a CPU and a program analyzed and executed by the CPU or may be realized as hardware based on wired logic.

Further, it is possible to realize the model training devices and the model training methods explained in the above embodiments, by causing a computer such as a personal computer or a workstation to execute a program prepared in advance. The program may be distributed via a network such as the Internet. Further, the program may be recorded on a non-transitory computer-readable recording medium such as a hard disk, a floppy disk (FD), a Compact Disk Read-Only Memory (CD-ROM), a Magneto Optical (MO) disk, a Digital Versatile Disk (DVD), or the like, so as to be executed as being read by a computer from the recording medium.

According to at least one aspect of the embodiments described above, it is possible to enhance the precision level of the model.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A model training device, comprising:
processing circuitry configured to:
obtain an initial learning model by learning a data set including medical images as learning data;
evaluate the initial learning model by using a global metric, so as to obtain, as error data sets, data sets each having an outlier from among a plurality of data sets used in the evaluation;
obtain a plurality of error data set groups by grouping the plurality of error data sets while using a local metric; and
specify model training information with respect to each of the error data set groups,
wherein the processing circuitry is further configured to train the initial learning model by supplementarily acquiring particular learning data based on the specified model training information and further re-learning the learning data, and
wherein the processing circuitry is further configured to predict a quantity of data sets required to train each of the plurality of error data set groups, and to supplementarily acquire the particular learning data based on the predicted quantity of data sets.

2. The model training device according to claim 1, wherein the local metric includes one of a local contour matching metric and a spatial distance metric.

3. The model training device according to claim 1, wherein the processing circuitry is further configured to:
segment a medical image corresponding to the error data sets so as to make it possible to distinguish a positional relationship between a detection target site serving as a detection target and another site positioned adjacent to the detection target site in the medical image;
separate a boundary region of the detection target site into a plurality of subregions, in accordance with two or more other adjacent sites including said another adjacent site;

calculate the local metric with respect to each of the subregions; and group the plurality of error data sets based on the subregions and the local metrics.

4. The model training device according to claim 3, wherein the local metrics are local contour matching metrics, and the processing circuitry is further configured to:

determine, with respect to each of the subregions, whether the subregion is oversegmented or undersegmented by comparing the local metric of the subregion with a threshold value; and organize, with respect to each of the subregions, error data sets each including an oversegmented subregion into a group and error data sets each including an undersegmented subregion into another group.

5. The model training device according to claim 1, wherein the processing circuitry is further configured to:

segment a medical image corresponding to the error data sets so as to make it possible to distinguish regions having mutually-different image characteristics within a detection target site serving as a detection target;

specify, from among the regions, regions each having a specific image characteristic as special regions;

calculate the local metric with respect to each of the special regions; and group the plurality of error data sets based on the special regions and the local metrics.

6. The model training device according to claim 5, wherein the local metrics are local contour matching metrics, and the processing circuitry is further configured to:

analyze at least one selected from among an image-related characteristic, an anatomical characteristic, and a pathological characteristic of the special regions, based on the local metrics of the special regions; and organize error data sets of the special regions having a mutually same image-related, anatomical, or pathological characteristic into a group.

7. The model training device according to claim 1, wherein the processing circuitry is further configured to specify at least one selected from among an image-related characteristic, an anatomical characteristic, and a pathological characteristic of each of the error data set groups as the model training information.

8. The model training device according to claim 1, wherein the processing circuitry is further configured to:

perform a learning curve fitting process on the model, by testing the initial learning model with respect to each of the error data set groups, while using a set made up of data sets included in the error data set group as a test set; and specify the model training information by predicting a quantity of pieces of learning data to be acquired or a precision level of the model required to construct a model corresponding to characteristics of the error data set groups based on a learning curve resulting from the fitting process.

9. The model training device according to claim 1, wherein, with respect to each of the plurality of error data set groups, the processing circuitry is further configured to acquire learning data corresponding to a characteristic of the error data set group based on the specified model training information and further generate a plurality of learning models respectively corresponding to the characteristics of the plurality of error data set groups.

10. A model training method implemented by a model training device, the model training method comprising:

obtaining an initial learning model by learning a data set including medical images as learning data;

evaluating the initial learning model by using a global metric so as to obtain, as error data sets, data sets each having an outlier from among a plurality of data sets used in the evaluation;

obtaining a plurality of error data set groups by grouping the plurality of error data sets obtained, while using a local metric; and specifying model training information with respect to each of the error data set groups obtained, wherein the method further comprises training the initial learning model by supplementarily acquiring particular learning data based on the model training information and further re-learning the learning data, and wherein the model training method further comprises predicting a quantity of data sets required to train each of the plurality of error data set groups, and supplementarily acquiring the particular learning data based on the predicted quantity of data sets.

* * * * *